US005787408A

United States Patent [19]

Deangelis

[11] Patent Number: 5,787,408
[45] Date of Patent: Jul. 28, 1998

[54] SYSTEM AND METHOD FOR DETERMINING NODE FUNCTIONALITY IN ARTIFICIAL NEURAL NETWORKS

[75] Inventor: Christopher M. Deangelis, Cranston, R.I.

[73] Assignee: The United States of America as represented by the Secretary of the Navy, Washington, D.C.

[21] Appl. No.: 702,300

[22] Filed: Aug. 23, 1996

[51] Int. Cl.⁶ .................................................. G06F 15/18
[52] U.S. Cl. ........................... 706/25; 706/16; 706/20; 706/27
[58] Field of Search ........................... 395/22, 23, 21; 706/25, 16, 20, 27

[56] References Cited

U.S. PATENT DOCUMENTS

| 5,438,644 | 8/1995 | Fu | 395/22 |
|---|---|---|---|
| 5,487,117 | 1/1996 | Burges et al. | 382/173 |
| 5,590,218 | 12/1996 | Ornstein | 382/157 |
| 5,619,616 | 4/1997 | Brady et al. | 395/22 |
| 5,636,326 | 6/1997 | Stork et al. | 395/23 |
| 5,640,492 | 6/1997 | Cortes et al. | 395/23 |
| 5,640,494 | 6/1997 | Jabri et al. | 395/22 |
| 5,659,666 | 8/1997 | Thaler | 395/23 |

*Primary Examiner*—George B. Davis
*Attorney, Agent, or Firm*—Michael J. McGowan; William F. Eipert; Prithvi C. Lall

[57] ABSTRACT

A system for unwrapping an artificial neural network (ANN) to determine the utilization and functionality of the nodes uses a network generator for generating an initial ANN architecture. Training and pruning processors operate to generate minimal ANN architectures having increasingly lower levels of classification accuracy. A network analyzer uses an analysis controller to receive minimal ANN architectures from the pruning processor. A connection analyzer operates on the minimal ANN architectures to identify the inputs to the minimal ANN architecture and determine the information represented by and contained in the network inputs. A node analyzer, coupled to the connection analyzer, then defines the utilization and functionality of each node in the minimal ANN architecture in terms of known functions.

13 Claims, 2 Drawing Sheets

SYSTEM AND METHOD FOR DETERMINING NODE FUNCTIONALITY IN ARTIFICIAL NEURAL NETWORKS

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED PATENT APPLICATION

This patent application is co-pending with a related patent application entitled SYSTEM AND METHOD FOR DETERMINING CLASS DISCRIMINATION FEATURES, U.S. Ser. No. 08/702,299, by Christopher M. DeAngelis and Robert W. Green.

BACKGROUND OF THE INVENTION (1) Field of the Invention

The present invention relates to artificial neural networks and pattern recognition or data classification systems in general. More particularly, the invention relates to a system for analyzing artificial neural networks to determine node utilization and functionality.

(2) Description of the Prior Art

The use of artificial neural networks for pattern recognition or data classification to classify an input signal into one of several predetermined classes is well known in the art. Artificial neural networks (ANN) have been applied to numerous disciplines with great success. When the different event classes have known, unique measurable characteristics and features, the classification problem is straightforward an it is relatively simple to understand how the different features are being used for classification. However, for many applications the characteristics of the classes and features that separate the classes are unknown currently there are no known techniques to unwrap a network to determine how the inputs are being combined to map to a desired output.

Determining how the inputs to a neural network are being combined and processed will make it possible to validate the operations of a network as well as to determine the bounding envelopes under which a network will correctly operate. Additionally, by determining how the inputs to a network are being combined and processed when the inputs are partly obscured or completely degraded, it is possible to gain insight into the network's performance under severe operating conditions.

Understanding the internal operation of a network will enable a network designer to provide a smaller, more robust network architecture. A smaller network architecture reduces system complexity, provides faster classification and may allow representation of the ANN with traditional circuits such as TTL circuitry or filters. Thus, what is needed is a system for unwrapping a network to determine node utilization and functionality.

SUMMARY OF THE INVENTION

Accordingly, it is a general purpose and object of the present invention to provide a system for determining the node utilization and functionality in artificial neural networks.

Another object of the present invention is the provision of a system for determining the minimal features necessary to discriminate between event classes.

A further object of the present invention is to provide a system for determining how the inputs to a neural network are being combined and processed.

These and other objects made apparent hereinafter are accomplished with the present invention by providing a system for unwrapping an artificial neural network (ANN) to determine the utilization and functionality of the nodes. The system uses a network generator for generating an initial ANN architecture. Training and pruning processors operate to generate minimal ANN architectures having increasingly lower levels of classification accuracy. A network analyzer uses an analysis controller to receive minimal ANN architectures from the pruning processor.

A connection analyzer operates on the minimal ANN architectures to identify the inputs to the minimal ANN architecture and determine the information represented by and contained in the network inputs. A node analyzer, coupled to the connection analyzer, then defines the utilization and functionality of each node in said minimal ANN architecture in terms of known functions.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DESCRIPTION OF THE PREFERRED EMBODIMENT

The present invention relates to a system and method for determining node utilization and functionality in artificial neural networks. Although the present invention is applicable to any artificial neural network based pattern recognition or data classification system, in describing the system and method of the present invention, reference will be made to a standard, fully connected, feedforward backprop network for classifying an input signal as being either a male or female voice.

Figure 1:
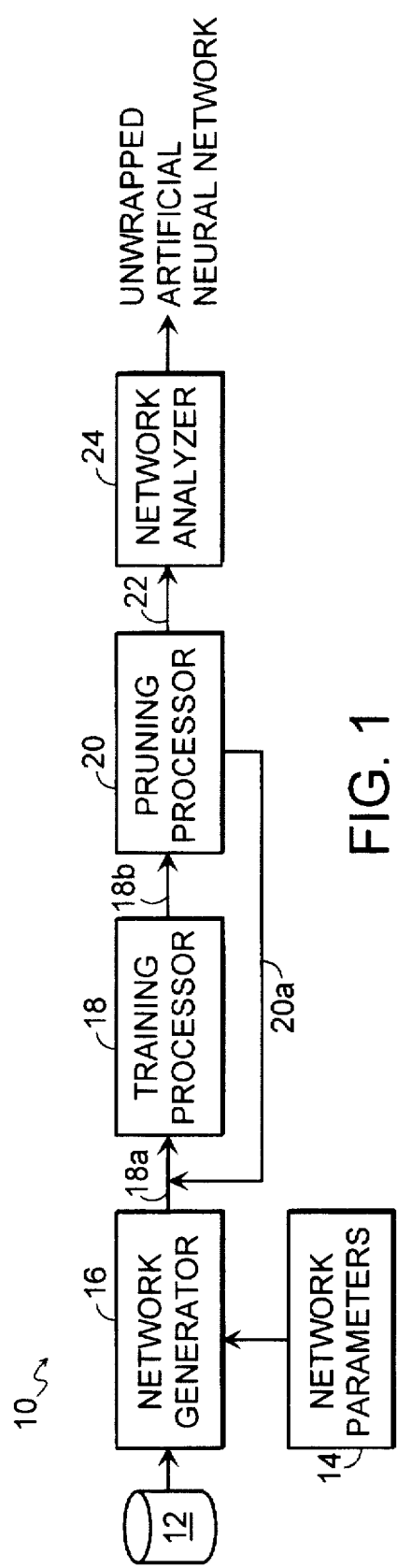
FIG. 1 shows a system for determining the node utilization and functionality in artificial neural networks.

Referring now to FIG. 1, there is shown a system 10 for determining the node utilization and functionality of an artificial neural network. Inputs to system 10 include repository 12 of samples/features which can be used for input to an artificial neural network (ANN) configured for a specific application, such as pattern recognition or data classification, and user defined network parameters 14.

Repository 12 comprises a plurality of samples and/or features used as inputs for training and/or testing an ANN. The samples/features of repository 12 can be any information desired for a particular application. However, the samples/features of repository 12 must be pre-associated with an event class; that is, the correct event class for each sample must be known. For example, in a flower classification system, repository 12 may contain several pictures of different types of flowers or a plurality of feature vectors defining properties of the flowers such as color, petal size, petal shape, number of petals, flower shape, size or the like. For a female/male voice recognition application, repository 12 may contain several sound clips of one or more different female voices and several sound clips of one or more different male voices.

User defined network parameters 14 contain information describing a network topology, number of input nodes, number of hidden layers, number of nodes per hidden layer, initial weights and biases, number of connections between layers or the like necessary to generate a conventional ANN having any topology desired. Additionally, network parameters 14 may contain information describing the type of input parameters or features to be used by the ANN. For example, to classify acoustic signals, the network parameters may indicate that average power, peak power, frequency components (Fourier transforms) or time/frequency components (wavelet transforms) are to be used as inputs to the ANN. User defined network parameters 14 for a female/male voice classification system may indicate that the initial network is a standard (fully connected, feedforward) backprop network having as inputs the twenty largest wavelet coefficients for a given sample.

ANN generator 16 uses the contents of repository 12 and/or the user defined network parameters 14 to generate an initial ANN architecture. Generator 16 can build a network having any initial architecture that is consistent with the contents of repository 12 and/or the requirements of network parameters 14. In addition to generating an initial network architecture, generator 16 can collect and compile the data necessary for training the initial network. For a female/male voice classification system, generator 16 may acquire samples (sound clips) for each event class and extract a feature vector from each of the samples by transforming the sample signal into a set of wavelet coefficients via a series of one-dimensional wavelet transforms and saving a number of the largest coefficients. The initial ANN architecture and training data are passed to training processor 18 where the initial ANN is trained.

Training processor 18 receives as input ANN 18a either the initial ANN architecture from generator 16 or pruned ANN 20a from pruning processor 20. Processor 18 trains the input ANN 18a using supervised training such as reinforcement learning, gradient based learning, or the like to generate trained ANN 18b.

Training Processor 18 attempts to train input ANN 18a to a desired degree of accuracy. Processor 18 continues to train input ANN 18a until the input ANN is "fully trained" or a "timeout" occurs. A fully trained ANN is a trained ANN 18b providing the mapping from $R^M$ to $R^N$, where M is the number of inputs and N is the number of event classes, to the desired degree of accuracy. A timeout occurs if processor 18 is unable to train input ANN 18a to the desired degree of accuracy within a given timeframe such as within a predetermined number of epochs, within a given amount of time, or the like. The trained ANN 18b generated by processor 18 when a timeout occurs will be referred to herein as a partially trained network. Training processor 18 passes trained ANN 18b to pruning processor 20.

Pruning processor 20 operates on trained ANN 18b received from training processor 18. If trained ANN 18b received from processor 18 is a fully trained ANN, pruning processor 20 stores a copy of the configuration of the fully trained ANN. Processor 20 then generates pruned ANN 20a by removing interconnections and. nodes from trained ANN 18b that are not required for the mapping from $R^M$ to $R^N$. Pruned ANN 20a is then passed back to training processor 18 to be retrained.

When a partially trained ANN is received from training processor 18, processor 20 passes the configuration of the last fully trained ANN received from processor 18 to network analyzer 24 as a minimal ANN architecture 22 for a given degree of accuracy. A minimal ANN architecture 22 for a given degree of accuracy is a subset model of the initial ANN describing the ANN configuration having the fewest number of nodes, weights, and biases that provides the mapping from $R^M$ to $R^N$ to a degree of accuracy. The remaining inputs of minimal ANN architecture 22 define the class discrimination features and identify the minimal features necessary to discriminate between event classes. Processor 20 then adjusts the desired degree of accuracy to equal the accuracy of the partially trained network received from processor 18 and stores a copy of the configuration of the partially trained network as a fully trained ANN. Processor 20 then generates a pruned ANN 20a by removing interconnections and nodes and passes the pruned ANN 20a to training processor 18.

Processor 20 continues to adjust the desired degree of accuracy and prune the trained ANN 18b until the accuracy of the partially trained network 18b received from processor 18 is approximately equal to that of a random guess. For a classifier having two possible event classes, such as the male/female voice classification system, the accuracy of a random guess is 50%. Similarly, for a classifier having three possible event classes, the accuracy of a random guess is 33.3%. When the accuracy of the partially trained network 18b is approximately equal to that of a random guess, pruning processor 20 notifies network analyzer 24 to begin processing.

Network analyzer 24 operates on each minimal ANN architecture 22 received from processor 20 to generate an unwrapped artificial neural network and to determine the node utilization and functionality. Network analyzer 24 begins by analyzing the last ANN 22 received from processor 20 and proceeds to analyze each minimal ANN 22 in the opposite order in which they were received. Each minimal ANN is analyzed to determine which inputs and/or combinations of inputs are used in the classifications process. That is, analyzer 24 identifies how the inputs are combined for the classification process. Analyzer 24 then defines the functionality for each of the nodes in terms of known functions given the inputs to the nodes, the weights and biases for the nodes, and the activation functions for the nodes.

Figure 2:
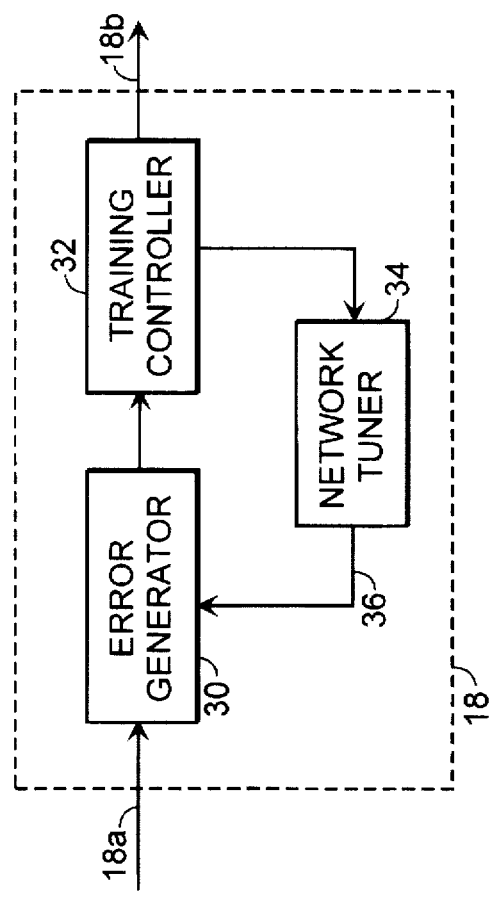
FIG. 2 is a block diagram of a training processor within a system for determining node functionality.

Referring now to FIG. 2 there is shown a block diagram of a training processor 18 for use in system 10 of FIG. 1. Training processor 18 comprises error generator 30 for generating the network error of a given ANN, training controller 32 for monitoring the training state of a given ANN, and network tuner 34 for adjusting the weights and biases of a given ANN based upon the network error.

Error generator 30 receives input ANN 18a from generator 16 or processor 20 (FIG. 1) or a weight adjusted ANN 36 from network tuner 34 and generates the network error, $E_N$, for the received ANN. Generator 30 can calculate $E_N$ using any conventional method. For the female/male voice classification backprop network, the network error is generated by running the training data through the ANN and summing the square of the error of each output.

Training controller 32 tracks and analyzes the network error, $E_N$, from generator 30 to determine whether to generate a trained ANN 18b as output or to signal tuner 34 to adjust weights and biases. Training controller 32 compares $E_N$ generated by generator 30 with a threshold error, $E_T$. If $E_N$ is less than $E_T$, the input ANN 18a has been trained to the desired level of accuracy, and controller 32 passes the input ANN to pruning processor 20 as a fully trained ANN 18b. If $E_N$ is greater than $E_T$, input ANN 18a has not been fully trained to the desired level of accuracy and controller 32 then must determine if a timeout has occurred. If a timeout has occurred, controller 32 passes the partially trained ANN 18b along with the network error $E_N$ for the partially trained ANN to processor 20. If a timeout has not occurred, controller 32 directs network tuner 34 to adjust the weights and biases of the ANN. Preferably, controller 32 determines whether a timeout has occurred by monitoring the change in $E_N$ calculated by generator 30 over time and indicating that a timeout has occurred if the improvement (reduction) in $E_N$ over a fixed number of epochs is less than a threshold reduction.

Network tuner 34 operates to adjust the weights and biases within the ANN. The weights and biases can be adjusted using any known tuning algorithm for network optimization suitable for the ANN architecture including, but not limited to, stabilized Newton, quasi-Newton or conjugate-gradient algorithms. Preferably, tuner 34 includes a weight and/or bias decay term such as the weight and/or the bias times a constant decay term, an adaptive decay term or the like in the tuning algorithm to encourage weight and/or bias terms to migrate to smaller absolute values. After adjusting the weights and biases, tuner 34 passes a weight adjusted ANN 36 to generator 30 for determination of network error.

Figure 3:
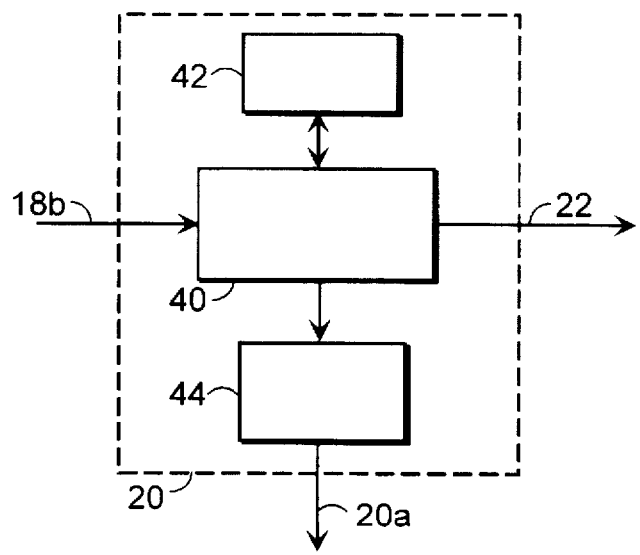
FIG. 3 is a block diagram illustrating a pruning processor within a system for determining node utilization and functionality in artificial neural networks.

FIG. 3 shows an embodiment of the pruning processor 20 of FIG. 1. Pruning processor 20 comprises pruning controller 40, pruning memory 42 and network pruner 44. Pruning controller 40 receives a trained ANN 18b from processor 18 (FIG. 1). If the trained ANN 18b received from processor 18 is a fully trained ANN, pruning controller 40 stores a copy of the configuration of the fully trained ANN in memory 42 and passes the fully trained ANN 18b to network pruner 44.

When a partially trained ANN 18b is received, controller 40 retrieves the configuration of the last fully trained ANN stored in memory 42 and supplies the configuration of the last fully trained ANN as a minimal ANN architecture 22 along with the error threshold $E_T$. Pruning controller 40 then checks the network error $E_N$ for the partially trained ANN 18b to determine if the classification performance for the partially trained ANN is better than that of a random guess. If the classification performance is better than a random guess (better than 50% for the male/female voice classification system), controller 40 adjusts the error threshold $E_T$ to equal the network error $E_N$ of the partially trained ANN 18b and passes the updated error threshold $E_T$ to training controller 32. Controller 40 then stores a copy of the configuration of the partially trained ANN in memory 42 as a fully trained ANN for the error threshold $E_T$ and passes the partially trained ANN to network pruner 44. If the classification performance is not better than that of a random guess, controller 40 signals analyzer 24 to begin analyzing the minimal ANN architecture(s) received from controller 40.

Network pruner 44 operates on the trained ANN 18b received from controller 40 to generate a pruned ANN 20a which is returned to training processor 18 (FIG. 1). Pruner 44 operates on the trained ANN 18b to remove nodes and interconnections that are not needed for classification. Pruner 44 first removes any insignificant connections to nodes. A connection to a node is considered to be insignificant if the weight for the connection is negligible when compared with the weights for all other connections to the same node. A weight may be considered to be negligible if it is one or more orders of magnitude less than the average of all other weights to that node. Pruner 44 may also remove the bias for a node if the bias is negligible (one or more orders of magnitude less) when compared to the sum of W·X over the entire training set where W is the vector of weights for the connections to the node and X is the vector of inputs to the node. Pruner 44 then removes any "dead" nodes. A dead node is defined as a node that has an output activation of approximately zero for all patterns. After removing the dead nodes, pruner 44 removes all the "saturated" nodes. A saturated node is defined as a node having a constant output activation between zero and one for all input patterns. When removing a saturated node, pruner 44 adds the average weighted activation of the removed node to the bias term of any follow node(s) connected to the saturated node. Pruner 44 then removes any "orphan"0 node from the ANN. An orphan node is a node having either no input connections or no output connections. Pruner 44 continues to prune until it can no longer remove any negligible connections or dead, saturated, or orphaned nodes. The resulting pruned ANN 20a is then passed back to the training processor.

Figure 4:
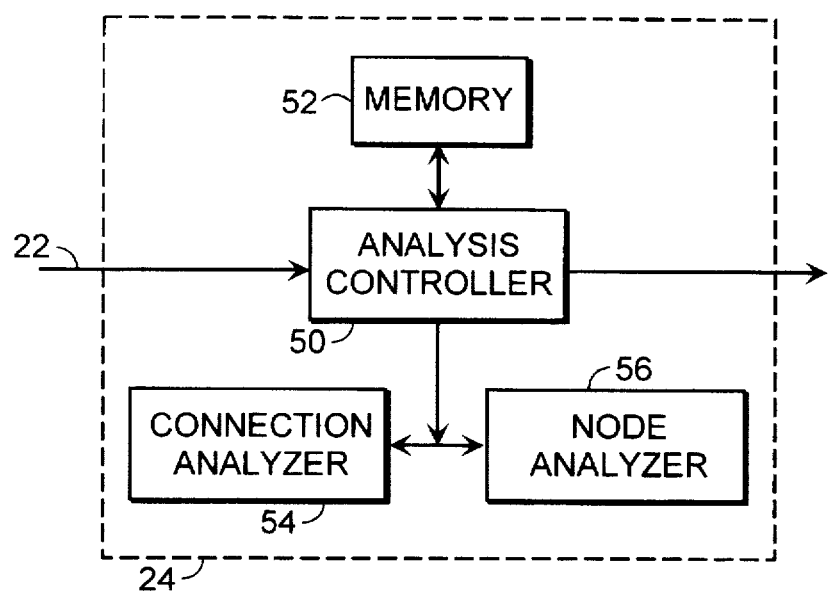
FIG. 4 is a block diagram illustrating a network analyzer within a system for determining node functionality in artificial neural networks.

Referring now to FIG. 4, there is shown a block diagram illustrating an embodiment of a network analyzer 24. Analyzer 24 comprises an analysis controller 50, analyzer memory 52, connection analyzer 54 and node analyzer 56. Analysis controller 50 receives one or more minimal ANN architectures 22 from pruning processor 20 (FIG. 1) and places each minimal ANN along with its associated error threshold $E_T$ into analyzer memory 52. When a "begin processing" signal is sent by pruning processor 20 (FIG. 1), controller 50 retrieves the last minimal ANN architecture 22 stored in memory 52 (the ANN architecture having the greatest associated error threshold $E_T$) and passes the minimal ANN to connection analyzer 54 and node analyzer 56 where the minimal ANN architecture is unwrapped to determine node utilization and functionality.

Connection analyzer 54 identifies the inputs to the minimal ANN and determines the type of information represented by or contained in those inputs as well as ascertaining which inputs are being combined together in the hidden and output layers. Analyzer 54 refers to repository 12 and/or user defined network parameters 14 (FIG. 1) to identify the information represented by or contained in each input to the minimal ANN. Analyzer 54 then examines the minimal ANN configuration to identify which inputs are being combined together and, for each node in the minimal ANN, identifies the type of information being combined together at the node. For the female/male voice classification system, the information contained in or represented by each input could be the magnitude, time, frequency, and time/frequency components of the sample signal with the information combined at a node being any combination or permutation of magnitude, time, frequency, and time/frequency components.

Using the information compiled by connection analyzer 54, node analyzer 56 defines the functionality of each of the nodes in terms of known functions given the inputs to the nodes, the weights and biases for the nodes, and the activation functions for the nodes. For the female/male voice classification system with magnitude, time, frequency, and time/frequency components of the sample signal as inputs, the nodes can be related to known functions from analog signal processing and filter theory. A node that has magnitude components may be related to a threshold detector or a DC offset bias. Nodes having frequency components as inputs can be related to filters with the weights and biases for the nodes indicating the shape, type (e.g., bandpass, band elimination, highpass, notch) and frequency response for the filter(s) (e.g., cutoff frequency, 3 dB down point). Nodes having time/frequency components as inputs can be equated to a tap-delay into the filter(s).

After connection analyzer 54 and node analyzer 56 determine the utilization and functionality of the nodes for a minimal ANN architecture, controller 50 retrieves the minimal ANN with the next largest associated error threshold $E_T$ from memory 52 and passes it to connection analyzer 54 and node analyzer 56 for unwrapping to determine node utilization and functionality. After one ANN has been unwrapped, subsequent determination of node utilization and functionality can be based on the utilization and functionality derived from the previously unwrapped networks or independent of the previously unwrapped networks.

The system 10 described herein may be implemented in hardware using standard electronic components to form the circuits for performing the functions in the various functional blocks; however, it is preferred to implement the system using a computer and software which carries out the aforementioned functions. The software may be in any desired language and may use standard mathematical techniques to perform the functions described herein. A software implementation is preferred due to greater degree of flexibility in reconfiguration for various types of inputs and network architectures as well as the limitations of current VLSI circuit densities.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. An apparatus for unwrapping an artificial neural network (ANN) comprising:

a network generator for generating an initial ANN architecture for mapping a plurality of network inputs to at least one network output;

a pruning processor having a pruning input for receiving an ANN and generating a selected one of a pruned ANN and a minimal ANN architecture, said pruning processor comprising means for removing weights and biases from ANN nodes, means for removing dead nodes, means for removing saturated nodes, and means for removing orphaned nodes, wherein a dead node is an ANN node having an output activation of approximately zero for every input pattern, a saturated node is an ANN node having an output activation of approximately one for every said input pattern, and an orphan node is an ANN node lacking a selected one of all input connections and all output connections;

a training processor, coupled to said network generator and said pruning processor, for receiving an input ANN, said input ANN being a selected one of said initial ANN architecture and said pruned ANN, and for generating a trained ANN from said input ANN, said trained ANN being coupled to said pruning input; and a network analyzer, coupled to receive said minimal ANN architecture, for generating an unwrapped artificial neural network, said network analyzer comprising a connection analyzer for identifying network inputs remaining in said minimal ANN architecture and determining the information represented by said remaining network inputs, and a node analyzer, coupled to said connection analyzer, for defining the utilization and functionality of each node in said minimal ANN architecture.

2. The apparatus of claim 1 wherein said training processor comprises:

means for generating a network error $E_N$ for said input ANN;

a training controller for comparing said network error $E_N$ with a threshold error $E_T$ and for generating a selected one of a trained ANN and a control signal; and a network tuner, coupled to said training controller, for adjusting the weights and biases of said input ANN in response to said control signal received from said training controller.

3. The apparatus of claim 2 wherein said training controller generates said fully trained ANN when said network error $E_N$ is less than said threshold error $E_T$.

4. The apparatus of claim 1 wherein said trained ANN generated by said training processor is a selected one of a fully trained ANN and a partially trained ANN and wherein said training processor further comprises:

means for generating a network error $E_N$ for said trained ANN; and a training controller for comparing said network error $E_N$ with a threshold error $E_T$.

5. The apparatus of claim 4 wherein said pruning processor generates said pruned ANN in response to receiving a fully trained ANN and generates said minimal ANN architecture in response to receiving a partially trained ANN.

6. The apparatus of claim 5 wherein said pruning processor further comprises means for adjusting said threshold error $E_T$ in response to receiving a partially trained ANN.

7. The apparatus of claim 6 wherein said training controller generates said fully trained ANN when said network error $E_N$ is less than said threshold error $E_T$.

8. A method for unwrapping an artificial neural network (ANN) comprising the steps of:

generating an initial ANN architecture for mapping a plurality of network inputs to at least one network output;

training said initial ANN architecture to generate a trained ANN;

pruning an input ANN to generate a pruned ANN, said input ANN being a selected one of said trained ANN and a retrained ANN;

training said pruned ANN to generate a retrained ANN, said retrained ANN being a selected one of a fully trained ANN and a partially trained ANN, said training said pruned ANN comprising the steps of adjusting a weight and bias of said pruned ANN, generating a network error $E_N$ for said weight and bias adjusted input ANN, comparing said network error $E_N$ to an error threshold $E_T$, and repeating the steps of adjusting a weight and bias, generating a network error $E_N$, and comparing said network error to said error threshold $E_T$ until a training threshold is met;

repeating the steps of pruning an ANN and training said pruned ANN until said retrained ANN generated is a partially trained ANN;

saving said retrained ANN as a minimal ANN architecture associated with said error threshold $E_T$;

reducing said threshold error $E_T$;

repeating the steps of pruning an input ANN, training said pruned ANN, saving said input ANN, and reducing said threshold error $E_T$ until said threshold error reaches a predetermined limit; and generating an unwrapped artificial neural network, said generating an unwrapped artificial neural network comprising retrieving said minimal ANN architecture associated with a predetermined error threshold $E_T$;

identifying the network inputs remaining in said retrieved minimal ANN architecture; determining the information represented by said remaining network inputs; and defining the functionality of each node in said retrieved minimal ANN architecture.

9. The method of claim 8 wherein said pruning an input ANN comprises removing weights and biases from ANN nodes, removing dead nodes; removing saturated nodes; and removing orphaned nodes; wherein a dead node is an ANN node having an output activation of approximately zero for every input pattern, a saturated node is an ANN node having an output activation of approximately one for every said input pattern, and an orphan node is an ANN node lacking a selected one of all input connections and all output connections.

10. The method of claim 9 wherein said reducing said threshold error $E_T$ adjusts said threshold error $E_T$ to equal to the network error $E_N$ of said partially trained network.

11. The method of claim 8 wherein the functionality of each node in said minimal ANN architecture is given as an analog signal processing function.

12. The method of claim 11 wherein the functionality of each node in said minimal ANN architecture is given as an analog filter.

13. The method of claim 11 wherein the functionality of each node in said minimal ANN architecture is given as a transfer function.

* * * * *